US007748765B2

(12) United States Patent
Byrnes et al.

(10) Patent No.: US 7,748,765 B2
(45) Date of Patent: Jul. 6, 2010

(54) HINGE

(75) Inventors: Robert T. Byrnes, Novi, MI (US); Timothy F. O'Brien, White Lake, MI (US); Daniel V. Beckley, Byron, MI (US)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 12/240,452

(22) Filed: Sep. 29, 2008

(65) Prior Publication Data

US 2010/0078957 A1 Apr. 1, 2010

(51) Int. Cl.
*B62D 25/00* (2006.01)

(52) U.S. Cl. ......................................... 296/56; 219/203

(58) Field of Classification Search ................... 296/56; 200/410, 385, 458.1, 443.1; 219/203
See application file for complete search history.

(56) References Cited

U.S. PATENT DOCUMENTS

| | | | | | |
|---|---|---|---|---|---|
| 2,389,704 | A | * | 11/1945 | Villani | 454/122 |
| 4,415,196 | A | * | 11/1983 | Baum et al. | 219/203 |
| 4,997,396 | A | * | 3/1991 | Gold et al. | 219/203 |
| 6,746,072 | B1 | * | 6/2004 | Romesburg et al. | 296/106 |
| 7,114,219 | B2 | * | 10/2006 | Kiefer et al. | 16/366 |
| 7,144,065 | B2 | * | 12/2006 | McClure et al. | 296/146.8 |
| 7,180,031 | B1 | * | 2/2007 | Loibl et al. | 219/203 |
| 7,246,840 | B2 | * | 7/2007 | Gates et al. | 296/106 |
| 7,375,692 | B2 | * | 5/2008 | Mondadori et al. | 343/713 |

* cited by examiner

*Primary Examiner*—Kiran B. Patel
(74) *Attorney, Agent, or Firm*—Honigman Miller Schwartz and Cohn LLP

(57) ABSTRACT

A sub-assembly of a lift-glass hinge is disclosed. The sub-assembly includes a conductive connection member including a central portion, a first terminal end and a second terminal end; a first conductive lead; and a second conductive lead, wherein each of the first and second conductive leads include a first end and a second end, wherein the first end of the first conductive lead is connected proximate one of the first and second terminal ends of the conductive connection member, wherein the first end of the second conductive lead is connected proximate the central portion of the conductive connection member. A lift-glass hinge is also disclosed. A vehicle system is also disclosed.

8 Claims, 5 Drawing Sheets

HINGE

TECHNICAL FIELD

The present invention generally relates to hinges and in particular, to a hinge for a lift-glass pane of a lift-gate assembly.

BACKGROUND OF THE INVENTION

The automotive industry is increasingly focusing on improvements to the manufacture process as well as the reduction in cost and weight of a vehicle. As a result, while known vehicular components have proven to be acceptable for various applications, such components are nevertheless susceptible to improvements that may enhance or improve the vehicle or its manufacture process. Therefore, a need exists in the art to develop improved vehicular components that advance the art.

SUMMARY OF THE INVENTION

The inventors of the present invention have recognized these and other problems associated with designing hinges for lift-glass sub-assemblies of lift-gate assemblies. To this end, the inventors have invented a sub-assembly of a lift-glass hinge comprising a conductive connection member including a central portion, a first terminal end and a second terminal end; a first conductive lead; and a second conductive lead, wherein each of the first and second conductive leads include a first end and a second end, wherein the first end of the first conductive lead is connected proximate one of the first and second terminal ends of the conductive connection member, wherein the first end of the second conductive lead is connected proximate the central portion of the conductive connection member. To this end, the inventors have invented a lift-glass hinge as well as a novel vehicle system.

DETAILED DESCRIPTION

Figure 4B:
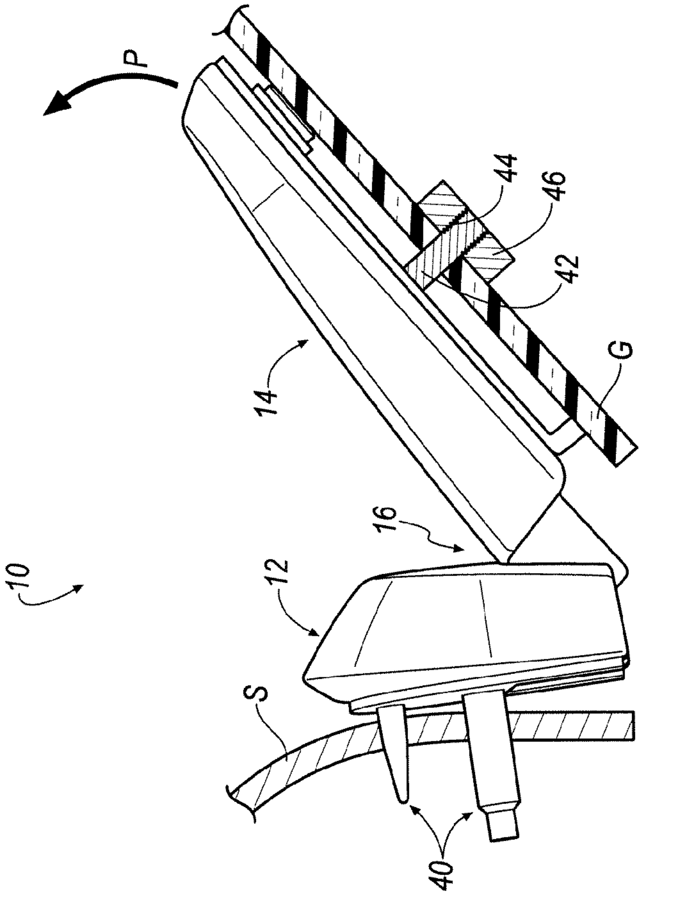
FIG. 4B is a side view of a hinge connected to the lift-glass according to line 4B-4B of FIG. 1B in accordance with an exemplary embodiment of the invention.
Figure 4A:
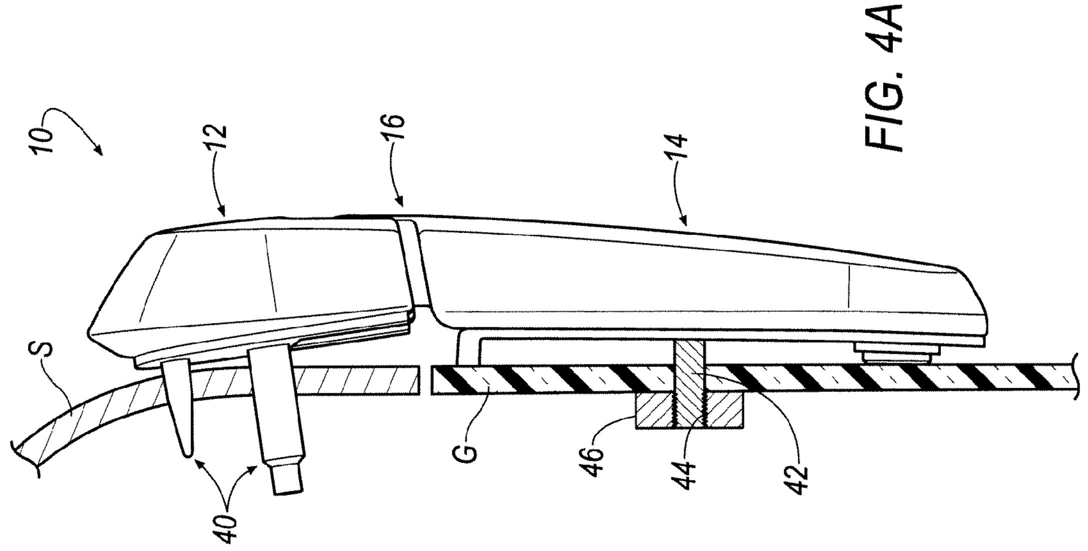
FIG. 4A is a side view of a hinge connected to the lift-glass according to line 4A-4A of FIG. 1A in accordance with an exemplary embodiment of the invention.
Figure 5:
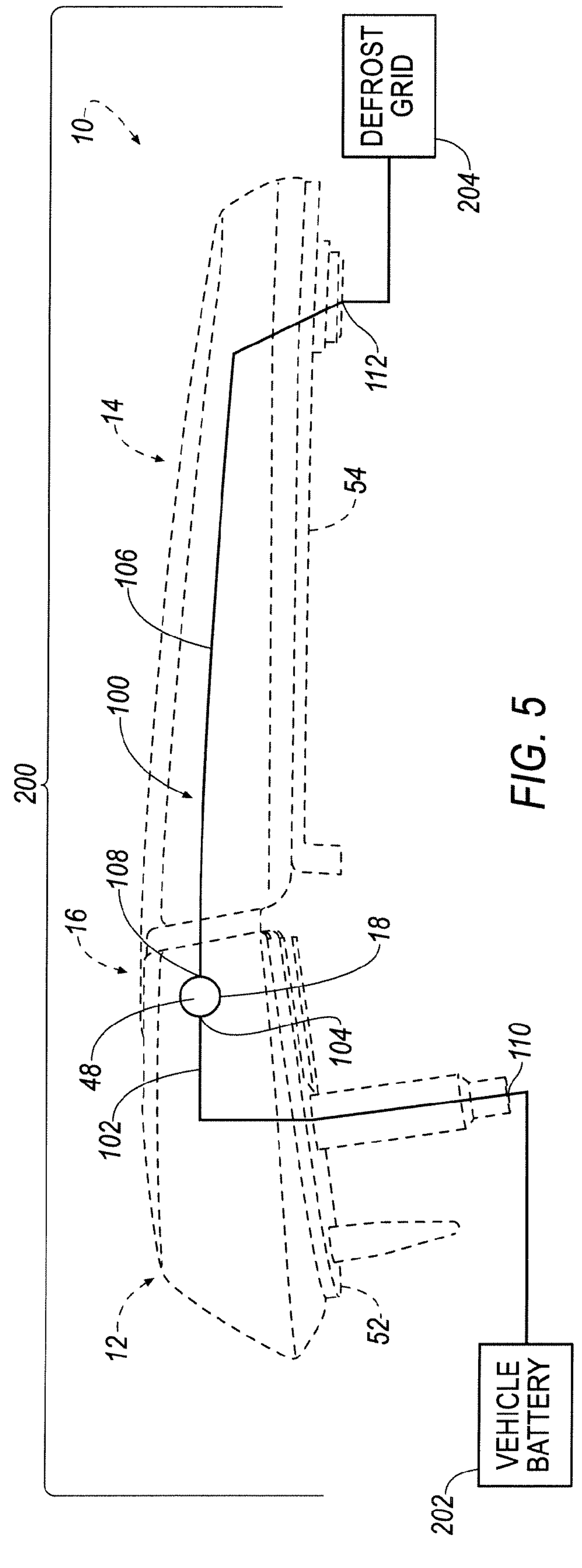
FIG. 5 is representative view a vehicular system and a sub-assembly of a hinge in accordance with an exemplary embodiment of the invention.
Figure 6:
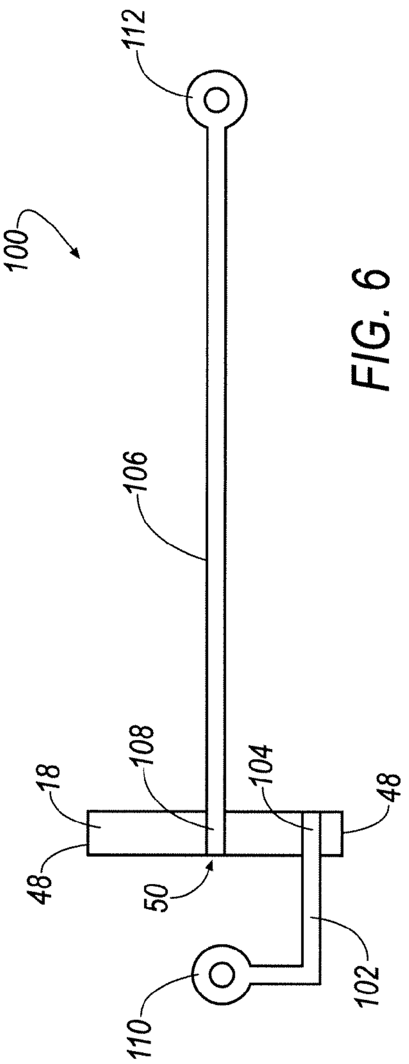
FIG. 6 is a top view of a sub-assembly of a hinge in accordance with an exemplary embodiment of the invention.
Figure 7:
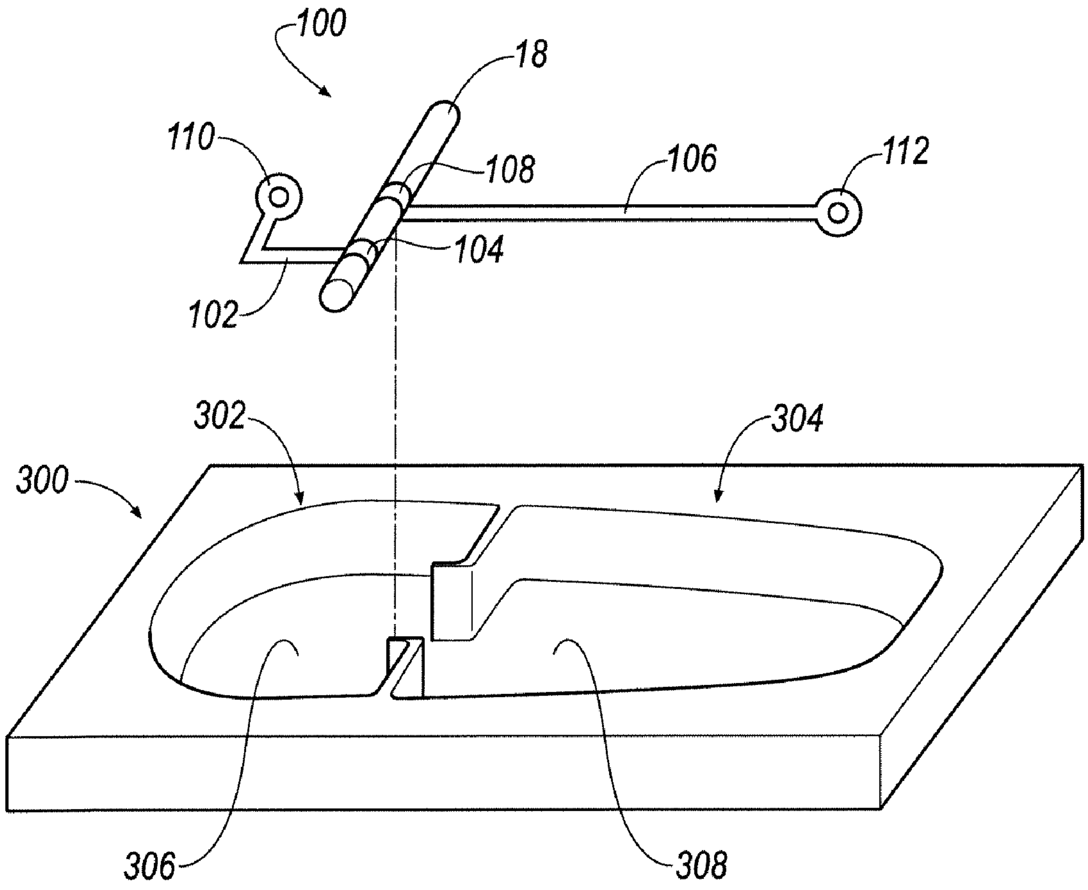
FIG. 7 is a perspective view of a lower mold half and the sub-assembly of FIG. 6 in accordance with an exemplary embodiment of the invention.

Referring to FIGS. 1A-5, a hinge is shown generally at 10 in accordance with an embodiment of the invention. In an embodiment, as seen at FIGS. 2-5, the hinge 10 may include a first portion 12 and a second portion 14. In an embodiment, the first portion 12 is coupled to the second portion 14 define a joint 16. In an embodiment, as seen in FIGS. 5-7, the first portion 12 is coupled to the second portion 14 by a conductive connection member 18 or the like. In an embodiment, the conductive connection member 18 may include a pin, torque engine, torsion spring, or the like.

Figure 2:
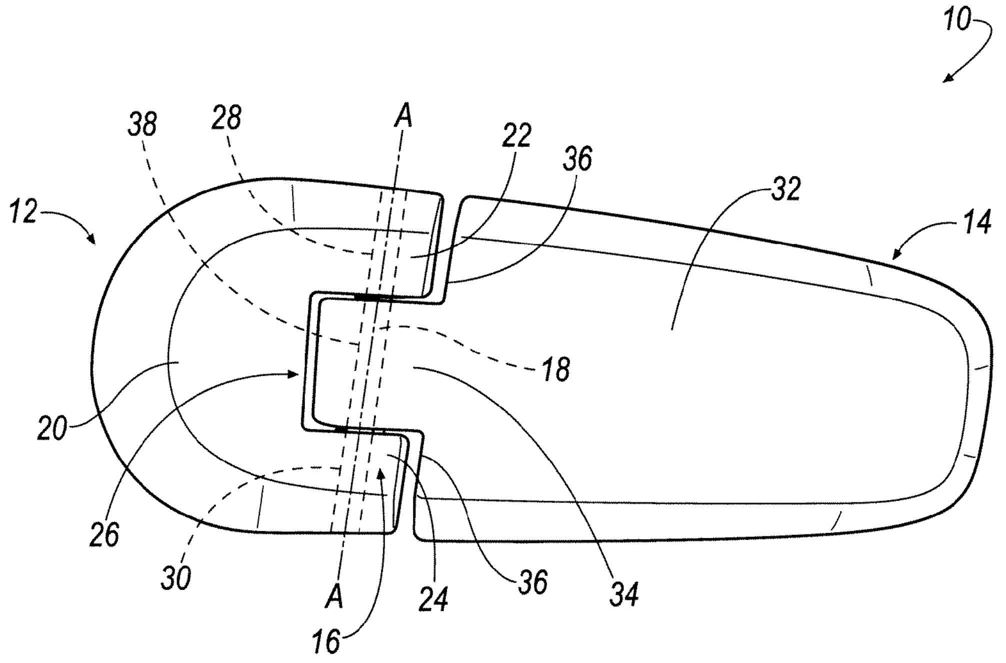
FIG. 2 is a front view of a hinge connectable to the lift-glass of FIGS. 1A-1B in accordance with an exemplary embodiment of the invention.
Figure 3:
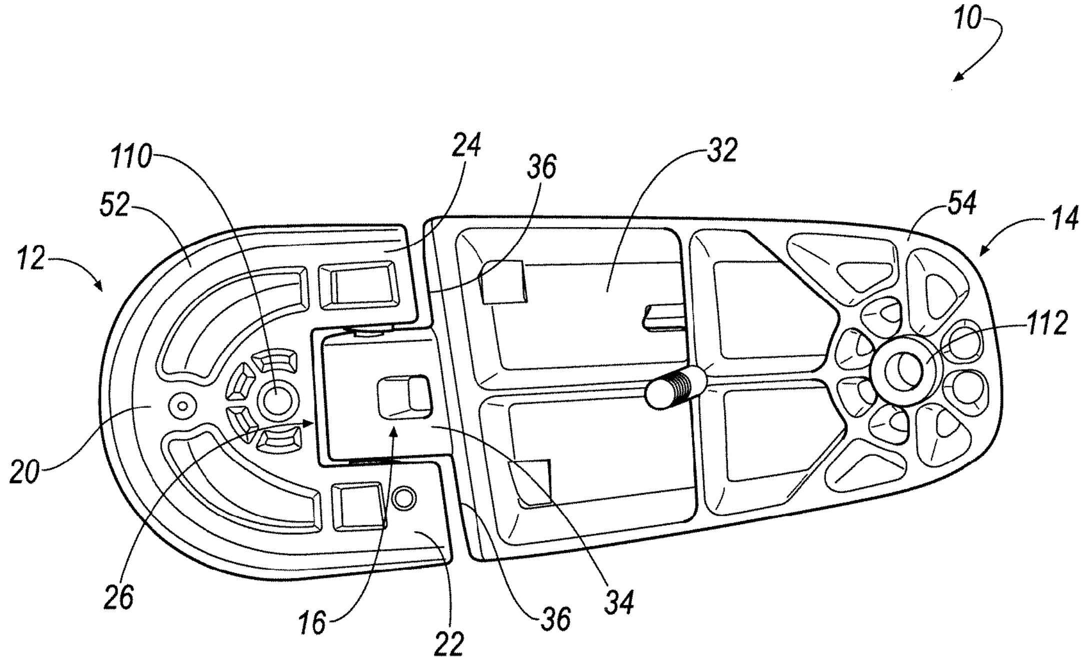
FIG. 3 is a rear view of a hinge connectable to the lift-glass of FIGS. 1A-1B in accordance with an exemplary embodiment of the invention.

Referring to FIGS. 2-3, in an embodiment, the first portion 12 generally defines a C-shaped member including a base portion 20, a first wing portion 22 extending from the base portion 20 and a second wing portion 24 extending from the base portion 20.

The base portion 20 and the first and second wing portions 22, 24 generally define a recess 26. Further, as seen in FIG. 2, in an embodiment, the first wing portion 22 defines a first passage 28 and the second wing portion 24 defines a second passage 30.

Referring to FIGS. 2-3, in an embodiment, the second portion 14 generally defines a body portion 32 and a head portion 34 extending from the body portion 32. The body portion 32 and the head portion 34 generally define shoulder portions 36.

In an embodiment, as seen in FIG. 2, the head portion 34 defines a third passage 38. In an embodiment, the first, second and third passages 28, 30, 38 may be coaxially-aligned according to axis, A-A, to permit receipt of the conductive connection member 18 in order to couple the first portion 12 to the second portion 14.

Figure 1A:
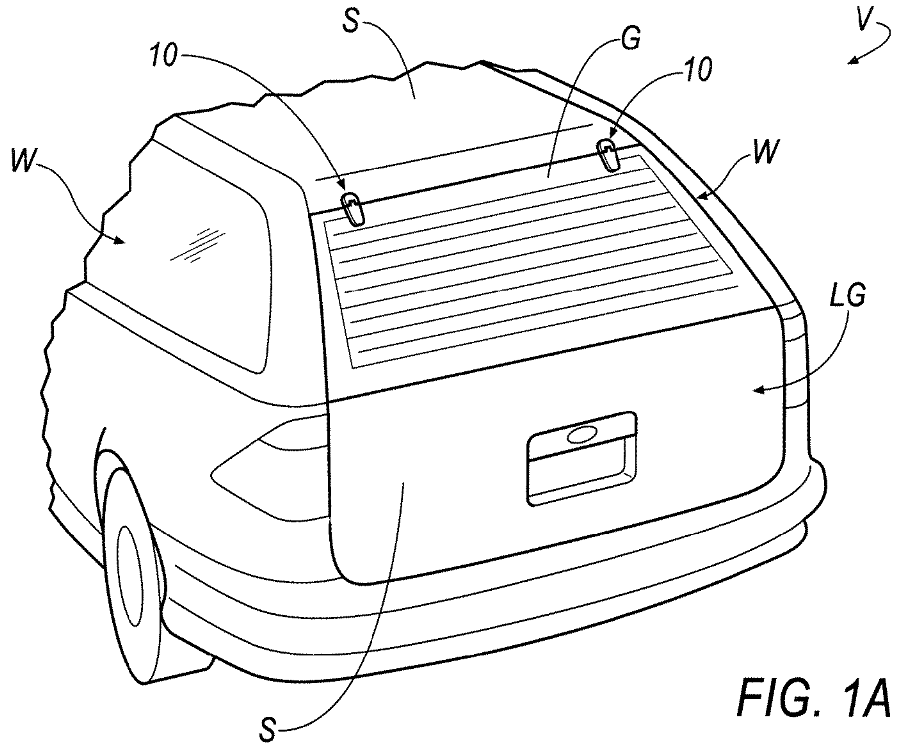
FIG. 1A is a perspective view of a vehicle including a lift-gate having lift-glass of oriented in a closed position relative the lift-gate assembly in accordance with an exemplary embodiment of the invention.
Figure 1B:
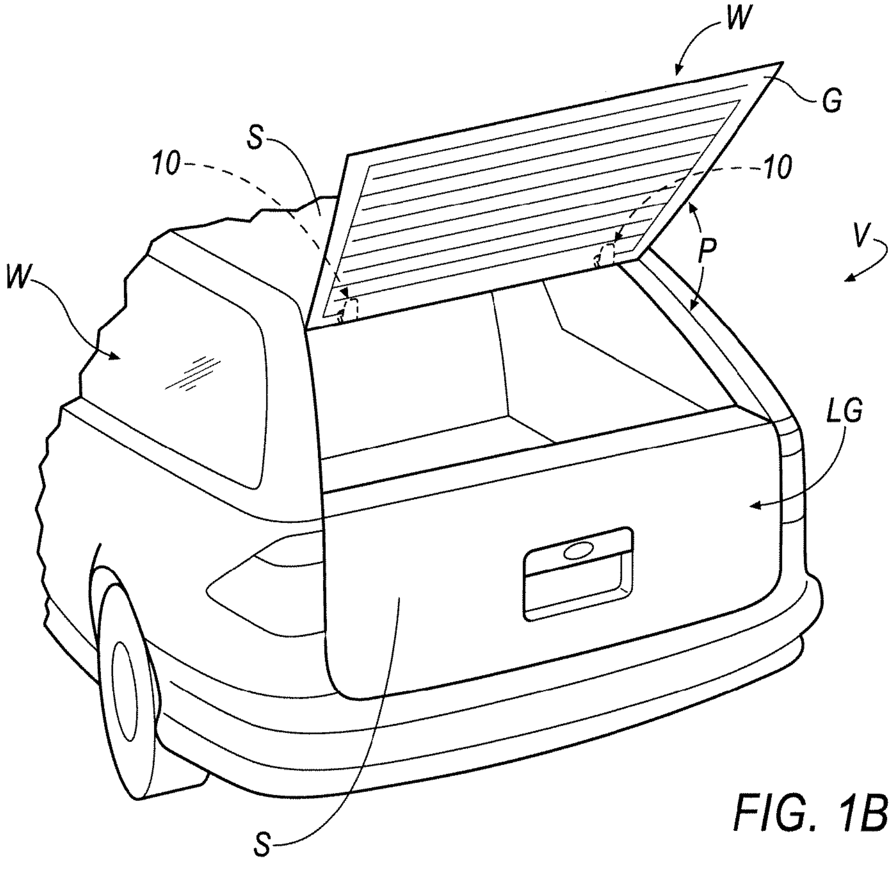
FIG. 1B is a perspective view of the vehicle including the lift-gate of FIG. 1A having lift-glass of oriented in an open position relative the lift-gate assembly in accordance with an exemplary embodiment of the invention.

Referring to FIGS. 1A-1B, a vehicle is shown generally at V in accordance with an embodiment of the invention. In an embodiment, the vehicle, V, may include a plurality of windows, W, including a pane of glass, G. In an embodiment, one or more of the panes of glass, G, may be pivotably-deployed relative sheet-metal body structure, S, of the vehicle, V. In an embodiment, the pivotable deployment, P (see, e.g., FIG. 1B), of the pane of glass, G, relative the body structure, S, is permitted by including one or more of the hinges 10 that connect the panel of glass, G, to the sheet-metal body structure, S, of the vehicle, V.

Because the pane of glass, G, is pivotably-deployed according to the direction of the arrow, P, the pane of glass, G, may be referred to as "lift-glass." As illustrated, the lift-glass, G, is pivotably-deployed, P, relative a lift-gate, LG, which may also be referred to as a hatch-back door. Pivotable deployment, P, of the lift-glass, G, permits access to the rear portion of the vehicle, V, without having to deploy the lift-gate, LG, from a closed position to an open position.

Referring to FIGS. 4A and 4B, in an embodiment, the first portion 12 of the hinge 10 may be joined to the sheet-metal body structure, S, by one or more connecting flanges 40 extending away from the first portion 12 as the second portion 14 of the hinge 10 may be joined to the lift-glass, G, by one or more flanges 42 extending away from the second portion 14. In an embodiment, the flange portion 42 may include an outer threaded surface 44 that cooperates with a threaded surface of a nut 46 that secures the lift-glass, G, to the second portion 44. In an embodiment, when the lift-glass, G, is pivotably-deployed, P, the first portion 12 may be referred to as a fixed portion and the second portion 14 may be referred to as a movable portion.

Referring to FIGS. 5-7, a sub-assembly 100 of the hinge 10 is shown in accordance with an exemplary embodiment of the invention. The sub-assembly 100 generally includes a first conductive lead 102 having a first end 104 connected to the conductive connection member 18 and a second conductive lead 106 having a first end 108 connecting to the conductive connection member 18. In an embodiment the first end 104 of the first conductive lead 102 is connected proximate one of the terminal ends 48 of the conductive connection member 18 whereas the first end 108 of the second conductive lead 106 is connected proximate a central portion 50 of the conductive connection member 18.

In an embodiment, the first end 104, 108 of each of the first and second conductive leads 102, 106 may be wrapped around the conductive connection member 18. In an alternative embodiment, the first end 104, 108 of each of the first and second conductive leads 102, 106 may be adhered to the conductive connection member 18 with a conductive adhesive.

In an embodiment, each of the first and second conductive leads 102, 106 may include a substantially flat ribbon or wire material. In an embodiment, the substantially flat ribbon or wire material may include copper. In an embodiment, the conductive connection member 18 may also include a conductive material, such as, for example, copper.

In an embodiment, each of the first and second conductive leads 102, 104 includes a second end or contact portion 110, 112. In an embodiment, as seen in FIG. 5, each of the contacts portions 110, 112 may be electrically-interfaced with components 202, 204 such that the sub-assembly 100 and components 202, 204 define a vehicular system 200. In an embodiment, the component 202 may comprise a power source, such as, for example, a vehicle battery, and, the component 204 may comprise a defrost grid that is provided on or connected to the lift-glass, G; accordingly, the sub-assembly 100 functions as a conductive bridge that provides power directly from the power source 202, through the hinge 10 and to the defrost grid 204.

Although the above discussion relating to FIGS. 1A-5 include a hinge 10 connected to lift-glass, G, it will be appreciated that the invention is not limited to the illustrated embodiment or a particular application. For example, rather than utilizing the hinge 10 to connect the lift-glass, G, to body structure, S, of the vehicle, V, the hinge 10 may be utilized to connected any type of non-lift-glass panel to the body structure, S, of the vehicle, V. Accordingly, in an embodiment, the panel may include a pane of glass defining a sidewall window, or, alternatively, a non-glass panel defining body structure. In an embodiment, the non-glass panel may include a sidewall panel or a hood that covers an engine compartment, or the like.

Further, it will be appreciated that the component 204 of the vehicular system 200 is not limited to include a defrost grid. For example, if the non-lift-glass panel is a hood of the vehicle, the component 204 may include an under-hood light bulb. In another embodiment, if, for example, the non-lift-glass panel is a sidewall body structure panel, the component 204 may include an exterior light bulb that functions as a marker, turn-signal indicator, or the like.

In an embodiment, the hinge 10 may include a synthetic resin material that insulates the conductive bridge defined by the sub-assembly 100. In an embodiment, the synthetic resin material may include an engineered thermoplastic. In an embodiment, the engineered thermoplastic may include reinforced nylon.

In an embodiment, the material defining the hinge 10 may be formed by a mold tool. Referring to FIG. 7, one half of a mold tool is shown generally at 300 in accordance with an embodiment of the invention. The half of the mold tool 300 generally defines a first cavity portion 302 and a second cavity portion 304. The first cavity portion 302 is utilized for fuming the first portion 12 of the hinge 10 and the second cavity portion 304 is utilized for foaming the second portion 14 of the hinge 10.

In an embodiment, prior to injecting material defining the hinge 10 into the mold tool, the sub-assembly 100 is deposited into the first and second cavity portions 302, 304. After depositing the sub-assembly 100 into the first and second cavity portions 302, 304, the mold tool is closed to permit injection of the material defining the hinge 10 for substantially encapsulating the sub-assembly 100 with the injected material.

Upon injecting the material defining the hinge 10, the sub-assembly 100 is substantially encapsulated by the material in order to electrically insulate the sub-assembly 100. However, in an embodiment, it will be appreciated that at least the contact portions 110, 112 of the first and second conductive leads 102, 106 are not entirely encapsulated/insulated by the material defining the hinge 10 in order to permit electrical connection of the sub-assembly 100 with the components 202, 204.

In an embodiment, for example, upon depositing the sub-assembly 100 into the first and second cavity portions 302, 304, it will be appreciated that the spatial orientation of the first and second conductive leads 102, 106 may be manipulated such that at least the contact portions 110, 112 are disposed substantially adjacent an end surface 306, 308 of each of the first and second cavity portions 302, 304. By positioning the contact portions 110, 112 substantially adjacent the end surface 306, 308 of each first and second cavity portions 302, 304 the contact portions 110, 112 may form part of an outer surface 52, 54 (see, e.g., FIGS. 3 and 5) of each of the first and second portions 12, 14 of the hinge 10 in order to permit the vehicle battery 202 to be connected to the contact portion 110 and the defrost grid 204 to be connected to the contact portion 112.

The embodiments disclosed herein have been discussed for the purpose of familiarizing the reader with novel aspects of the invention. Although preferred embodiments of the invention have been shown and described, many changes, modifications and substitutions may be made by one having ordinary skill in the art without necessarily departing from the spirit and scope of the invention as described in the following claims.

The invention claimed is:

1. A lift-glass hinge comprising:

a first portion;

a second portion, wherein each of the first and second portions includes at least one passage;

a conductive connection member that extends through the at least one passage of each of the first and second portions to pivotably-connect the first portion to the second portion, wherein the conductive connection member includes a central portion, a first terminal end and a second terminal end;

a first conductive lead; and a second conductive lead, wherein each of the first and second conductive leads include a first end and a second end, wherein the first end of the first conductive lead is connected proximate one of the first and second terminal ends of the conductive connection member, wherein the first end of the second conductive lead is connected proximate the central portion of the conductive connection member, wherein the first conductive lead extends through and is electrically-insulated by the first portion, wherein the second conductive lead extends through and is electrically-insulated by the second portion.

2. The lift-glass hinge according to claim 1, wherein at least a portion of the second end of the first conductive lead is not electrically-insulated by the first portion, wherein at least a portion of the second end of the second conductive lead is not electrically-insulated by the second portion, wherein the second end of the first conductive lead defines means for electrically-interfacing the lift-gate hinge with a power source, and, wherein the second end of the second conductive lead defines means for electrically-interfacing the lift-gate hinge with an electrical accessory vehicular component.

3. The sub-assembly according to claim 2, wherein the electrical accessory vehicular component includes a defrost grid, wherein the defrost grid is connected to lift-glass of a lift-gate.

4. The sub-assembly according to claim 2, wherein the electrical accessory vehicular component includes a light source, wherein the light source is connected to a vehicular panel.

5. The lift-glass hinge according to claim 1, wherein each of the first conductive lead, the second conductive lead and the conductive connection member include a conductive material.

6. The lift-glass hinge according to claim 5, wherein the conductive material includes copper.

7. The lift-glass hinge according to claim 1, wherein one or more of the first and second portions include reinforced nylon.

8. The lift-glass hinge according to claim 1, wherein the conductive connection member includes one of a pin, torque engine or torsion spring.

* * * * *